(12) United States Patent
Lin et al.

(10) Patent No.: US 12,445,723 B2
(45) Date of Patent: Oct. 14, 2025

(54) METHOD AND APPARATUS FOR LENS FOCUSING, COMPUTER DEVICE AND STORAGE MEDIUM

(71) Applicant: ZHEJIANG UNIVIEW TECHNOLOGIES CO., LTD., Hangzhou (CN)

(72) Inventors: Kai Lin, Hangzhou (CN); Yan Wang, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 58 days.

(21) Appl. No.: 18/690,585

(22) PCT Filed: Jul. 4, 2022

(86) PCT No.: PCT/CN2022/103601
§ 371 (c)(1),
(2) Date: Mar. 8, 2024

(87) PCT Pub. No.: WO2023/040423
PCT Pub. Date: Mar. 23, 2023

(65) Prior Publication Data
US 2025/0119644 A1    Apr. 10, 2025

(30) Foreign Application Priority Data
Sep. 18, 2021 (CN) .......................... 202111096405.6

(51) Int. Cl.
*H04N 23/67* (2023.01)
*H04N 23/60* (2023.01)

(52) U.S. Cl.
CPC ........... *H04N 23/673* (2023.01); *H04N 23/64* (2023.01)

(58) Field of Classification Search
None
See application file for complete search history.

(56) References Cited

U.S. PATENT DOCUMENTS 5,353,089 A    10/1994 Yaji
9,232,131 B2 *   1/2016 Kawarada ............ H04N 23/635
(Continued)

FOREIGN PATENT DOCUMENTS

CN    101718620 A    6/2010
CN    102510444 A    6/2012
(Continued)

OTHER PUBLICATIONS

English translation of, JP-2004037733-A, Fujii, 2004 (Year: 2004).*
(Continued)

*Primary Examiner* — James M Hannett
(74) *Attorney, Agent, or Firm* — MASCHOFF BRENNAN (57) ABSTRACT

Provided are a method and an apparatus for lens focusing, a computer device, and a storage medium. The method includes: acquiring a test image obtained by a lens shooting a reference image at a current focusing position, and determining a low-frequency modulation transfer function value of the test image; in response to determining that the low-frequency modulation transfer function value meets a preset value range condition, determining a high-frequency modulation transfer function value of the test image, determining a movement step according to the high-frequency modulation transfer function value, and controlling the lens to move according to the movement step; and using the next focusing position which the lens moves to according to the movement step as a new current focusing position to focus the lens for one time.

20 Claims, 6 Drawing Sheets

Acquire a test image obtained by a lens shooting a reference image at a current focusing position, and calculate a low-frequency modulation transfer function value of the test image — S110

In response to determining that the low-frequency modulation transfer function value meets a preset value range condition, calculate a high-frequency modulation transfer function value of the test image, determine a movement step according to the high-frequency modulation transfer function value, and control the lens to move according to the movement step — S120

Use the next focusing position which the lens moves to according to the movement step as a new current focusing position to focus the lens for another time — S130

(56) References Cited

U.S. PATENT DOCUMENTS

| | | | |
|---|---|---|---|
| 11,494,894 B2* | 11/2022 | Cheng | G06F 18/2413 |
| 11,711,611 B2* | 7/2023 | Ogawa | H04N 23/675 |
| | | | 348/345 |
| 2003/0222980 A1 | 12/2003 | Miyagaki et al. | |
| 2017/0230567 A1* | 8/2017 | Takao | H04N 25/445 |
| 2017/0257549 A1 | 9/2017 | Davis et al. | |
| 2020/0389598 A1* | 12/2020 | Takao | H04N 23/672 |

FOREIGN PATENT DOCUMENTS

| | | | |
|---|---|---|---|
| CN | 103809348 A | | 5/2014 |
| CN | 203882012 U | | 10/2014 |
| CN | 104184939 A | | 12/2014 |
| CN | 104917970 A | | 9/2015 |
| CN | 105093480 A | | 11/2015 |
| CN | 105182498 A | | 12/2015 |
| CN | 105430277 A | | 3/2016 |
| CN | 105493497 A | | 4/2016 |
| CN | 106210520 A | | 12/2016 |
| CN | 107333123 A | | 11/2017 |
| CN | 109521547 A | | 3/2019 |
| CN | 112312028 A | | 2/2021 |
| CN | 113114947 A | | 7/2021 |
| CN | 113556470 A | | 10/2021 |
| CN | 113556740 A | | 10/2021 |
| JP | 2004037733 A | * | 2/2004 |
| JP | 3555583 B2 | * | 8/2004 |
| JP | 2007150541 A | | 6/2007 |
| JP | 2008233389 A | | 10/2008 |
| JP | 2017044798 A | * | 3/2017 |
| WO | WO-2020/246346 A1 | | 12/2020 |

OTHER PUBLICATIONS

English translation of, JP-2017044798-A, Cai, 2017 (Year: 2017).*
English translation of, JP-3555583-B2, 藤井 真 -, 2004 (Year: 2004).*
International Search Report in Application No. PCT/CN2022/103601, dated Sep. 28, 2022, 4 pages, including translation.
Wei et al., "An auto-focus algorithm for tongue in age acquisition based on in age processing", Journal of Shandong University (Engineering Science), Aug. 2011.
Drauschke et al., "Mechanical Eye Model for Comparison of Optical and Physiological Imaging Properties", 12$^{th}$ IFAC Conference on Programmable Devices and Embedded Systems, The International Federation of Automatic Control, Sep. 25-27, 2013, Velke Karlovice, Czech Republic.
Bai et al., "Method of choosing ideal imaging plane in image intensifier MTF measurement", Journal of Applied Optics, Mar. 2009.
First Office Action in Chinese Application No. 2021110961405.6, dated Nov. 10, 2021, 11 pages, including translation.
Wei et al., "An auto-focus algorithm for tongue in age acquisition based on image processing", Journal of Shandong University (Engineering Science), Aug. 2011, vol. 41, No. 4.
Bai et al., "Method of choosing ideal imaging plane in image intensifier MTF measurement", Journal of Applied Optics, Mar. 2009, vol. 30, No. 2.
First Office Action in Chinese Application No. 202111096405.6, dated Nov. 10, 2021, 11 pages, including translation.

* cited by examiner

METHOD AND APPARATUS FOR LENS FOCUSING, COMPUTER DEVICE AND STORAGE MEDIUM

CROSS-REFERENCE TO RELATED APPLICATION(S)

This is a national stage application filed under 37 U.S.C. 371 based on International Patent Application No. PCT/CN2022/103601, filed Jul. 4, 2022, which claims priority to Chinese Patent Application No. 202111096405.6 filed with the China National Intellectual Property Administration (CNIPA) on Sep. 18, 2021, the disclosures of which are incorporated herein by reference in their entireties.

TECHNICAL FIELD

Embodiments of the present application relate to the field of image processing technologies, for example, a method and an apparatus for lens focusing, a computer device, and a storage medium.

BACKGROUND

In a lens focusing solution in the related, a gradient value is typically used as an evaluation standard for the definition of an image. The greater the gradient value of the image, the higher the definition of the image. However, since there is no specific upper limit value for the gradient value, it is necessary to repeatedly confirm the peak value of the gradient value, which is inefficient.

SUMMARY

Embodiments of the present application provide a method and an apparatus for lens focusing, a computer device, and a storage medium.

In a first aspect, an embodiment of the present application provides a method for lens focusing. The method includes the steps below.

A test image obtained by a lens shooting a reference image at a current focusing position is acquired, and a low-frequency modulation transfer function value of the test image is determined.

In response to determining that the low-frequency modulation transfer function value meets a preset value range condition, a high-frequency modulation transfer function value of the test image is determined, a movement step is determined according to the high-frequency modulation transfer function value, and the lens is controlled to move according to the movement step.

The next focusing position which the lens moves to according to the movement step is used as a new current focusing position to focus the lens for one time.

In a second aspect, an embodiment of the present application further provides an apparatus for lens focusing. The apparatus includes a low-frequency modulation transfer function value calculation module, a movement step determination module, and new current focusing position determination module.

The low-frequency modulation transfer function value calculation module is configured to acquire a test image obtained by a lens shooting a reference image at a current focusing position and determine a low-frequency modulation transfer function value of the test image.

The movement step determination module is configured to, in response to determining that the low-frequency modulation transfer function value meets a preset value range condition, determine a high-frequency modulation transfer function value of the test image, determine a movement step according to the high-frequency modulation transfer function value, and control the lens to move according to the movement step.

The new current focusing position determination module is configured to use the next focusing position which the lens moves to according to the movement step as a new current focusing position to focus the lens for one time.

In a third aspect, an embodiment of the present application further provides a computer device including a memory, a processor, and a computer program stored in the memory and executable by the processor, where the processor, when executing the computer program, implements the method for lens focusing according to any one of the embodiments of the present application.

In a fourth aspect, an embodiment of the present application further provides a storage medium including computer-executable instructions, where the computer-executable instructions, when executed by a computer processor, are configured to perform the method for lens focusing according to any one of the embodiments of the present application.

DETAILED DESCRIPTION

The present application is described below in conjunction with drawings and embodiments. It is to be understood that the embodiments described herein are intended to illustrate and not to limit the present application. Additionally, it is to be noted that to facilitate description, only part, not all, of structures related to the present application are illustrated in the drawings.

Figure 1:
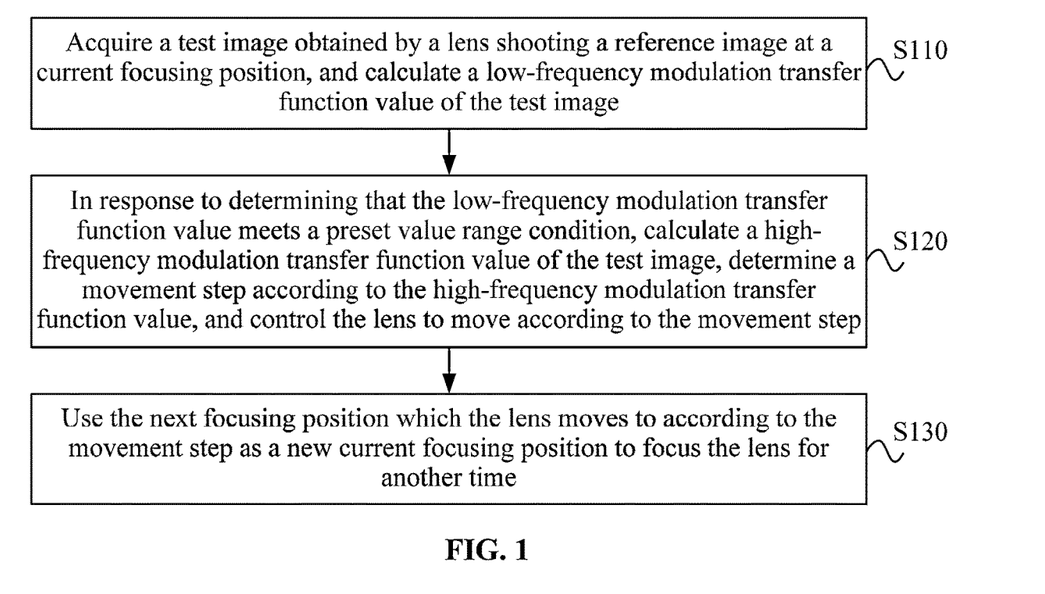
FIG. 1 is a flowchart of a method for lens focusing according to an embodiment of the present application.

FIG. 1 is a flowchart of a method for lens focusing according to an embodiment of the present application. In this embodiment, a corresponding lens of an imaging mechanism, such as a video camera or a camera, may be focused. The method may be performed by an apparatus for lens focusing. The apparatus may be implemented in completely or partially by software, hardware, or a combination of software and hardware and is generally integrated into a computer device. For example, the apparatus may be used with an imaging mechanism including a lens such as a movable video camera or a movable camera.

As shown in FIG. 1, the embodiment of the present application includes the steps below.

In S110, a test image obtained by a lens shooting a reference image at a current focusing position is acquired, and a low-frequency modulation transfer function value of the test image is calculated.

The current focusing position refers to a position where the lens is currently located. For example, a movement mechanism may be configured to be connected to the lens or an imaging mechanism corresponding to the lens, and the lens is driven by the movement mechanism to move so that the position of the lens is adjusted.

In this embodiment, the reference image provides a picture environment for this embodiment. For example, the reference image includes a feature pattern which matches a modulation transfer function algorithm. The test image refers to an image obtained by the lens shooting the reference image at the current focusing position.

For the low-frequency modulation transfer function (MTF) value, an MTF describes a transfer function at different spatial frequencies. The evaluation of a resolution may be performed through an MTF value. The MTF value may be represented by the ratio of the contrast of the test image to the contrast of the reference image, and the contrast of the test image is always less than the contrast of the reference image. Therefore, the MTF value is between 0 and 1. The closer the MTF value is to 1, the higher the resolution of the test image is, and the better the definition of the test image is. The low-frequency MTF value refers to an MTF value corresponding to a spatial frequency of a low-frequency band in the test image and represents a comprehensive measure of the contrast of the whole image.

In an embodiment, the maximum value of MTF values of spatial frequencies of the low-frequency band in the test image may be used as the low-frequency MTF value, the average value of MTF values of spatial frequencies of the low-frequency band in the test image may be used as the low-frequency MTF value, or the median value of MTF values of spatial frequencies of the low-frequency band in the test image may be used as the low-frequency MTF value. The selection of a low-frequency band range and a determination manner of the low-frequency MTF value should not be limitations on the present application.

In the embodiment of the present application, the lens shoots the reference image at the current focusing position to obtain the test image and calculates the low-frequency MTF value of the test image. The low-frequency MTF value represents the comprehensive measure of the contrast of the whole image. Therefore, a test image whose contrast meets a requirement may be quickly positioned through the low-frequency MTF value.

In S120, in response to determining that the low-frequency modulation transfer function value meets a preset value range condition, a high-frequency modulation transfer function value of the test image is calculated, a movement step is determined according to the high-frequency modulation transfer function value, and the lens is controlled to move according to the movement step.

The low-frequency modulation transfer function value meets the preset value range condition, which refers to that the low-frequency MTF value is greater than or equal to a preset value. For example, the MTF value greater than 0.9 represents very excellent image definition, the MTF value from 0.7 to 0.9 represents excellent image definition, the MTF value from 0.5 to 0.7 represents normal image definition, and the MTF value less than 0.5 represents relatively poor image definition. Therefore, the preset value may be set to 0.7. In addition, thresholds of the MTF value corresponding to different evaluation items may be determined through a deep neural network model. A specific setting of the preset value and a determining manner of the preset value are not limited in this embodiment.

The high-frequency modulation transfer function value refers to an MTF value corresponding to a spatial frequency of a high-frequency band in the test image and represents a measure of details such as the edge and contour of the image. Similarly, one or more of the maximum value, average value, or median value of MTF values of spatial frequencies of the high-frequency band in the test image may be used as the high-frequency modulation transfer function value. The selection of a high-frequency band range and a determination manner of the high-frequency MTF value are not limited in this embodiment.

The movement step refers to a distance which the lens moves from the current focusing position to the next focusing position. After the movement step is determined according to the high-frequency MTF value, the lens may be controlled, through the movement mechanism to move the distance of the movement step to arrive at the next focusing position.

In the embodiment of the present application, the low-frequency MTF value represents the comprehensive measure of the contrast of the whole image, and the high-frequency MTF value represents the measure of the details such as the edge and contour of the image. The determination of the preset value range is performed on the low-frequency MTF value so that the test image whose contrast meets the requirement is quickly positioned, and the lens is controlled, according to the high-frequency MTF value, to vary a step to move so that the details of the image are evaluated and focusing is implemented.

In S130, the next focusing position which the lens moves to according to the movement step is used as a new current focusing position to focus the lens for one time.

In the embodiment of the present application, the calculation and determination of the low-frequency MTF value are performed on the test image, and when the contrast of the image meets the requirement, the movement step is calculated according to the high-frequency MTF value and the lens is controlled to perform the variable-step movement so that the details of the image are evaluated. The preceding movement process is repeated such that the lens is controlled to perform the variable-step movement. Thus, the peak value of the definition of the test image can be determined without repeated hill climbing so that focusing efficiency is improved.

In an embodiment, after the focusing is implemented once, data such as the current focusing position, the low-frequency MTF value, and the high-frequency MTF value may be stored in a database, thereby facilitating subsequent problem backtracking and assisting in the adjustment of multiple thresholds.

In this embodiment, the reference image is shot by the lens at the current focusing position so that the test image is obtained, in response to the low-frequency modulation transfer function value of the test image meeting the preset value range condition, the high-frequency modulation transfer function value of the test image is calculated, the movement step is determined according to the high-frequency modulation transfer function value, the lens moves to the next focusing position according to the movement step, and the next focusing position is used as the new current focusing position. The problem that in the focusing manner in the related art, the peak value of gradient values needs to be searched through the repeated hill climbing and efficiency is relatively low is solved. Thus, the lens is focused quickly and efficiently.

Figure 2A:
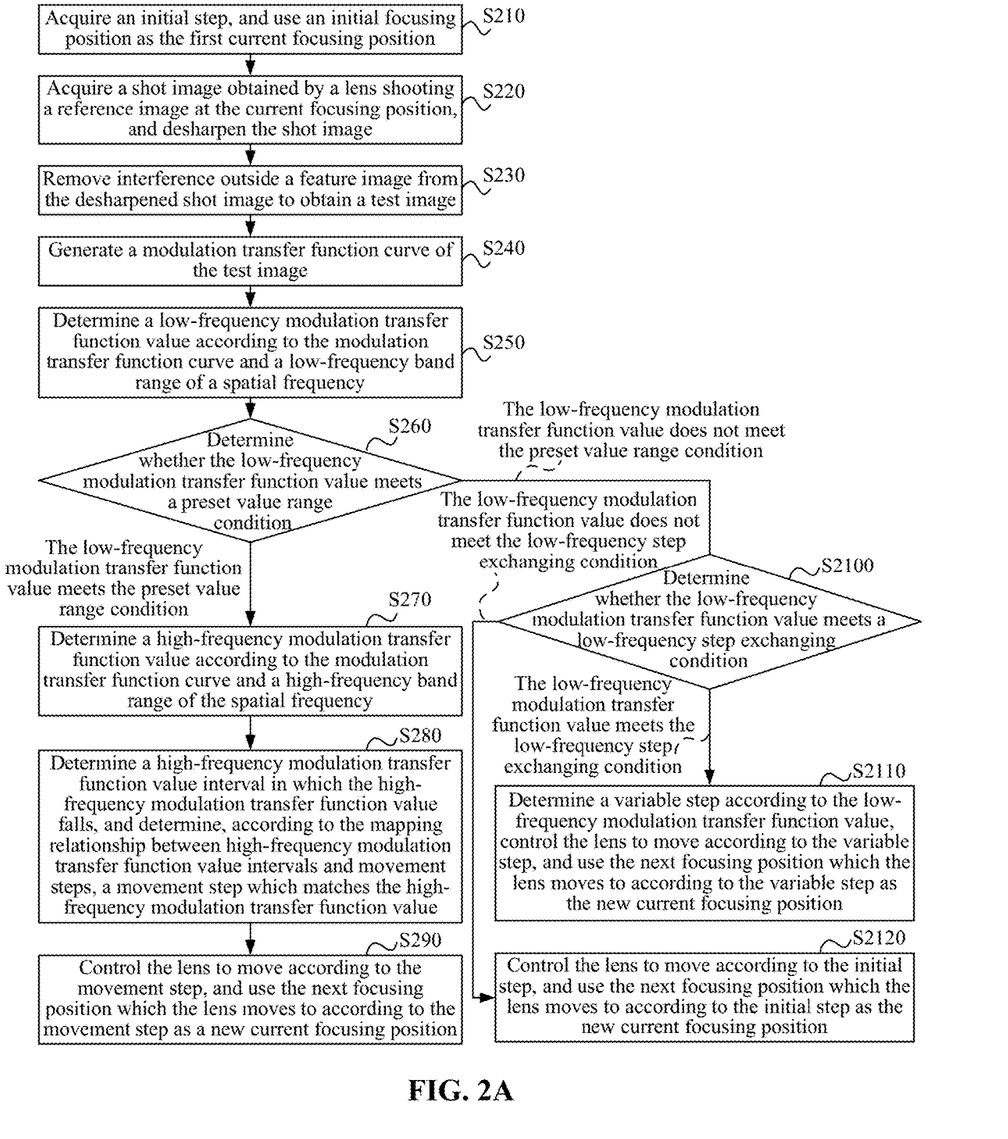
FIG. 2A is a flowchart of a method for lens focusing according to an embodiment of the present application.

FIG. 2A is a flowchart of a method for lens focusing according to an embodiment of the present application. Based on the preceding embodiment, the process where the test image is acquired, the process where the low-frequency modulation transfer function value of the test image and the high-frequency modulation transfer function value of the test image are calculated, and the process where the movement step is determined according to the high-frequency modulation transfer function value are described in the embodiment of the present application, and the step in which the movement to the next focusing position is performed according to an initial step when the low-frequency modulation transfer function value does not meet the preset value range condition is added in the embodiment of the present application.

As shown in FIG. 2A, the embodiment of the present application includes the steps below.

In S210, the initial step is acquired, and an initial focusing position is used as the first current focusing position.

The initial step is greater than the movement step.

In an early focusing process, the lens moves in relatively large initial steps. When the low-frequency MTF value of the test image meets the requirement, the high-frequency MTF value of the test image is calculated, and the movement step is determined according to the high-frequency MTF value so that the lens is controlled to perform the variable-step movement.

In the embodiment of the present application, the relatively large initial step is determined so that the lens can move in large steps and the contrast of the test image quickly meets the requirement, thereby improving the focusing efficiency.

In S220, a shot image obtained by the lens shooting the reference image at the current focusing position is acquired, and the shot image is desharpened.

Figure 2B:
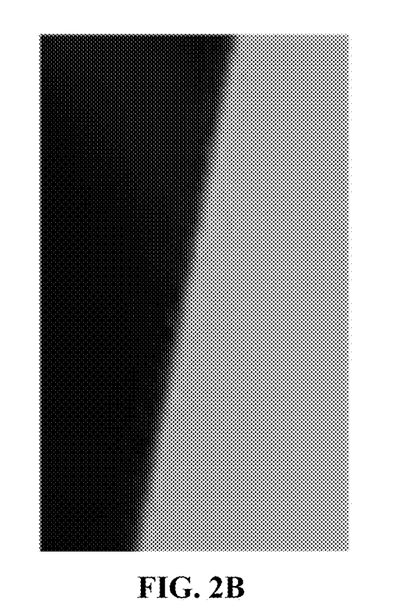
FIG. 2B is a schematic diagram of a feature pattern according to an embodiment of the present application.

The reference image includes the feature pattern, and the feature pattern needs to meet a requirement of the calculation of the MTF value. For example, for setting the feature pattern, reference may be made to a standard resolution test chart. For example, FIG. 2B provides a schematic diagram of a feature pattern. As shown in FIG. 2B, the feature pattern may be a pattern including an oblique line and having a black left portion and a white right portion. However, setting the feature pattern is not limited in this embodiment.

If the shot image is sharpened, the edge information or contour information of the feature pattern in the shot image is enhanced, affecting the definition of the shot image. Therefore, the accuracy with which the MTF value is calculated is affected. Therefore, the shot image may be desharpened before the MTF value is determined so that the accuracy with which the calculation of the MTF value is performed on the test image later is ensured.

In S230, interference outside a feature image is removed from the desharpened shot image so that the test image is obtained.

The feature pattern included in the shot image is used for the calculation of an MTF algorithm. Therefore, for the shot image, to ensure the accuracy with which the MTF value is calculated, the interference outside the feature image is removed from the desharpened shot image. For the obtained test image, the feature pattern may be directly positioned and the MTF value is calculated.

In an embodiment, the feature pattern may be represented as a region of interest (ROI), which may be an edge chart for calculating an MTF curve, and another pattern except the edge chart may be recorded as an interference pattern. In the edge chart, in addition to a black edge block, there may be another type of feature pattern (for example, a blank region or a mark point).

The interference outside the feature image may be understood as interference caused by another image other than the feature image.

In an embodiment, the interference outside the feature image is removed, which may be represented as ROI positioning. For example, the center of the edge chart is positioned according to specific pixel coordinates, and a required target feature pattern is obtained in conjunction with an edge dimension.

In S240, a modulation transfer function curve of the test image is generated.

In an embodiment, generating the modulation transfer function curve of the test image may include: positioning and obtaining the feature pattern in the test image, calculating modulation transfer function values at different spatial frequencies of the feature pattern, and generating the modulation transfer function curve according to at least one of the modulation transfer function values.

For example, the feature pattern in the test image may be positioned through the MTF algorithm, and the MTF values at the different spatial frequencies of the feature pattern may be calculated so that the MTF curve is generated. Alternatively, the feature pattern in the test image may be positioned through a spatial frequency response (SFR) algorithm. A continuous black-and-white oblique line with two hues is extracted based on the feature pattern, and then the change rate of the oblique line is obtained. Then, the MTF values at the different spatial frequencies are obtained through a Fourier transform so that the MTF curve is generated. A specific manner in which the MTF curve is generated is not limited in this embodiment.

Figure 2C:
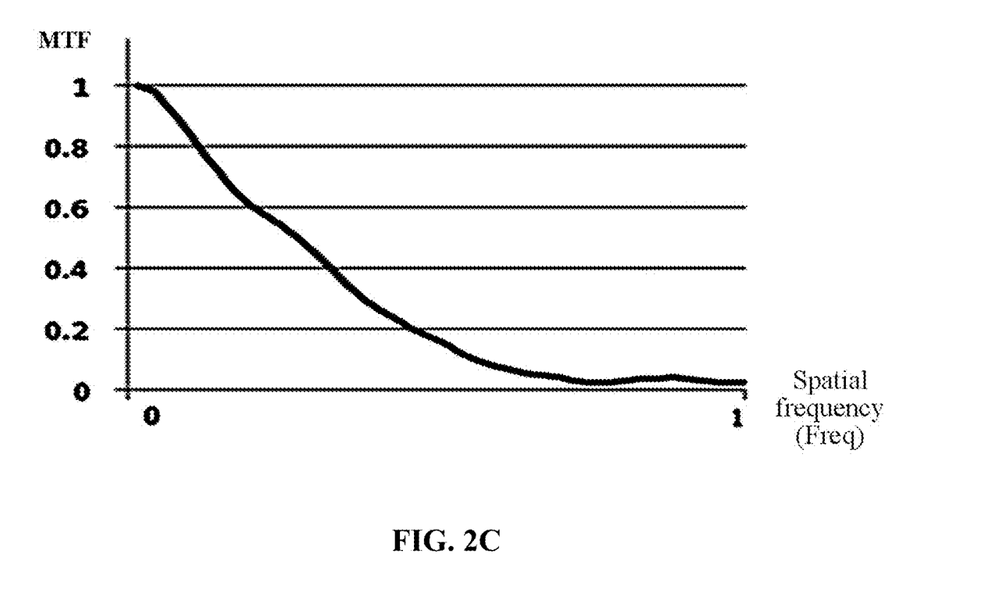
FIG. 2C is a schematic diagram of a modulation transfer function curve according to an embodiment of the present application.

FIG. 2C provides a schematic diagram of a modulation transfer function curve. As shown in FIG. 2C, the spatial frequency (Freq) is on the abscissa of the modulation transfer function curve, the spatial frequency is used for denoting the number of line pairs per millimeter in the image, and the value of the spatial frequency is from 0 to 1. The MTF value is on the ordinate of the modulation transfer function curve, and the modulation transfer function curve represents the variation of the MTF value from a low frequency to a high frequency.

In the embodiment of the present application, the MTF curve may be generated through the MTF algorithm, thereby facilitating the determination of the low-frequency MTF value and the determination of the high-frequency MTF value.

In S250, the low-frequency modulation transfer function value is determined according to the modulation transfer function curve and a low-frequency band range of the spatial frequency.

The low-frequency band range may be preset. For example, spatial frequencies from 0 to 0.5 may be set as the low-frequency band range, or spatial frequencies from 0 to 0.4 may be set as the low-frequency band range. The value of the low-frequency band range is not limited in this embodiment.

After the MTF curve and the low-frequency band range are acquired, the maximum value of MTF values in the low-frequency band range may be used as the low-frequency MTF value, the average value of MTF values in the low-frequency band range may be used as the low-frequency MTF value, or the median value of MTF values in the low-frequency band range may be used as the low-frequency MTF value, which is not limited in this embodiment.

In S260, it is determined whether the low-frequency modulation transfer function value meets the preset value range condition. When the low-frequency modulation transfer function value meets the preset value range condition, S270 is performed. When the low-frequency modulation transfer function value does not meet the preset value range condition, S2100 is performed.

When the low-frequency MTF value is greater than or equal to the preset value, the high-frequency MTF value is calculated so that the movement step is determined and the lens performs the variable-step movement.

When the low-frequency MTF value is less than the preset value and is less than a preset low-frequency step variation value, the lens still keeps moving in the large initial steps. When the low-frequency MTF value is greater than or equal to the preset low-frequency step variation value, a variable step may be determined according to the low-frequency MTF value and the lens is controlled to perform the variable-step movement so that the contrast of the test image quickly reaches a specified threshold or a specified threshold range.

In S270, the high-frequency modulation transfer function value is determined according to the modulation transfer function curve and a high-frequency band range of the spatial frequency.

In the embodiment of the present application, the high-frequency band range may be preset. In this embodiment, the value of the high-frequency band range and a manner in which the high-frequency MTF value is determined according to the MTF curve and the high-frequency band range are not limited.

The spatial frequency, that is, the number of line pairs per millimeter (lp/mm), refers to the number of times an image function changes within a unit length. It is to be noted that the range of the low frequency and the range of the high frequency are not limited in this embodiment. During implementation, any value in the high-frequency band range is greater than any value in the low-frequency band range so that an implementation requirement can be met.

In an embodiment, in the security industry, the low frequency may generally be 20 lp/mm or 30 lp/mm, and the high frequency may be determined according to the limit frequency of a corresponding sensor. Generally, the high frequency may be defined as 120 lp/mm or 140 lp/mm and may be specifically determined according to a specific project.

In S280, a high-frequency modulation transfer function value interval in which the high-frequency modulation transfer function value falls is determined, and the movement step which matches the high-frequency modulation transfer function value is determined according to the mapping relationship between high-frequency modulation transfer function value intervals and movement steps.

In the embodiment of the present application, the map relationships between the high-frequency modulation transfer function value intervals and the movement steps may be preset so that different high-frequency modulation transfer function value intervals correspond to respective movement steps. For example, it may be set that the greater the high-frequency modulation transfer function value, the smaller the movement step. In addition, it is to be noted that the movement step needs to be less than the initial step.

Figure 2D:
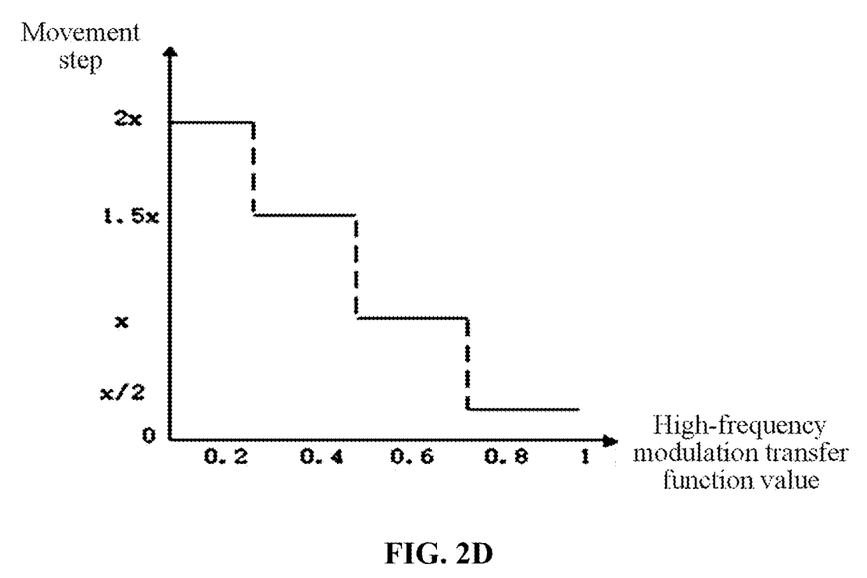
FIG. 2D is a schematic diagram showing a relationship between high-frequency modulation transfer function values and movement steps according to an embodiment of the present application.

FIG. 2D provides a schematic diagram showing a relationship between high-frequency modulation transfer function values and movement steps. As shown in FIG. 2D, when the high-frequency MTF value is in an interval of 0 to 0.2, a corresponding movement step is 2x, where x denotes a unit step, when the high-frequency MTF value is in an interval of 0.2 to 0.5, a corresponding movement step is 1.5x, when the high-frequency MTF value is in an interval of 0.5 to 0.7, a corresponding movement step is x, and when the high-frequency MTF value is in an interval of 0.7 to 1, a corresponding movement step is x/2.

In S290, the lens is controlled to move according to the movement step, and the next focusing position which the lens moves to according to the movement step is used as the new current focusing position.

In the embodiment of the present application, after the movement step is determined according to the high-frequency MTF value, the variable-step movement may be performed so that the lens arrives at the next focusing position to complete a focusing process. Alternatively, the next focusing position may be continuously used as the new current focusing position. The preceding process is repeated and the variable-step movement of the lens is continuously performed, thereby implementing the focusing.

In S2100, it is determined whether the low-frequency modulation transfer function value meets a low-frequency step exchanging condition. When the low-frequency modulation transfer function value meets the low-frequency step exchanging condition, S2110 is performed. When the low-frequency modulation transfer function value does not meet the low-frequency step exchanging condition, S2120 is performed.

The low-frequency step exchanging condition refers to that although the low-frequency modulation transfer function value is less than the preset value, the low-frequency modulation transfer function value is greater than or equal to the preset low-frequency step variation value. In this case, although it is not necessary to calculate the high-frequency modulation transfer function value, the step is reduced and the variable-step movement is performed.

It is to be noted that the preset value should be greater than the preset low-frequency step variation value.

In S2110, the variable step is determined according to the low-frequency modulation transfer function value, the lens is controlled to move according to the variable step, and the next focusing position which the lens moves to according to the variable step is used as the new current focusing position.

When the low-frequency modulation transfer function value is greater than or equal to the preset low-frequency step variation value and is less than the preset value, a matched variable step is determined according to the low-frequency MTF value, and the lens is controlled to perform the variable-step movement according to the variable step.

It is to be noted that the initial step should be greater than the variable step. However, in this embodiment, the size of the variable step and the size of the movement step are not limited.

Figure 2E:
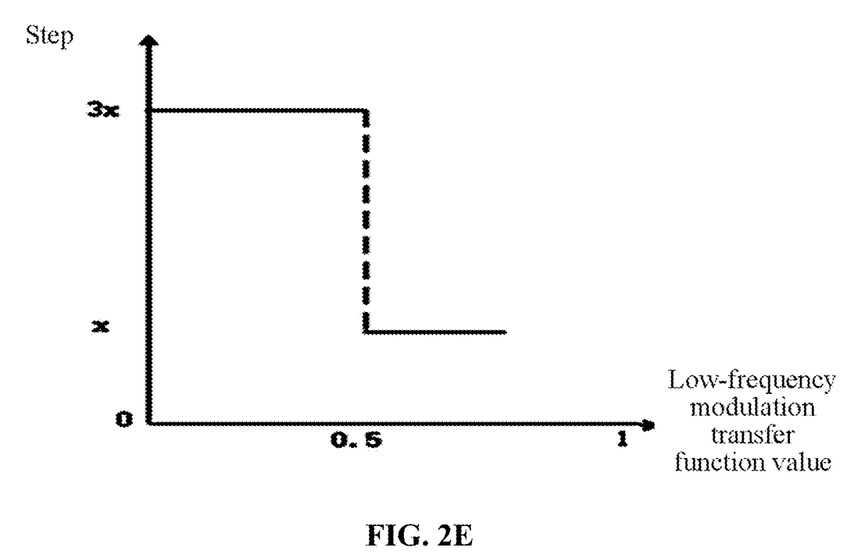
FIG. 2E is a schematic diagram showing a relationship between low-frequency modulation transfer function values and steps according to an embodiment of the present application.

FIG. 2E provides a schematic diagram showing a relationship between low-frequency modulation transfer function values and steps. As shown in FIG. 2E, the preset low-frequency step variation value may be 0.5, and the preset value may be 0.8, when the low-frequency MTF value is less than 0.5, the initial step may be set to 3x, when the low-frequency MTF value is greater than or equal to 0.5 and less than 0.8, the variable step may be set to x, and when the low-frequency MTF value is greater than 0.8, the high-frequency MTF value is calculated, and the variable-step movement is performed according to the high-frequency MTF value.

In S2120, the lens is controlled to move according to the initial step, and the next focusing position which the lens moves to according to the initial step is used as the new current focusing position.

In the embodiment of the present application, in an initial focusing process, when the low-frequency MTF value is less than the preset low-frequency step variation value, a large-step movement in the initial step is maintained. When the low-frequency MTF value is greater than or equal to the preset low-frequency step variation value but is less than the preset value, the step of the lens is adjusted to the variable step so that the contrast of the test image quickly reaches a required effect. When the low-frequency MTF value is greater than or equal to the preset value, the high-frequency MTF value is determined, the movement step is determined according to the high-frequency MTF value, and the variable-step movement is performed so that details such as the edge and contour of the test image quickly meet a required effect.

In this embodiment, the reference image is shot by the lens at the current focusing position, the shot image is desharpened and the interference outside the feature image is removed from the desharpened shot image so that the test image is obtained, the modulation transfer function curve of the test image is generated and the low-frequency modulation transfer function value is calculated according to the modulation transfer function curve, when the low-frequency modulation transfer function value meets the preset value range condition, the high-frequency modulation transfer function value is calculated according to the modulation transfer function curve, the movement step is determined according to the high-frequency modulation transfer function value, the lens moves to the next focusing position according to the movement step, and the next focusing position is used as the new current focusing position, when the low-frequency modulation transfer function value does not meet the low-frequency step exchanging condition, the lens is controlled to move according to the initial step, and the next focusing position which the lens moves to according to the xx step at is used as the new current focusing position, and when the low-frequency modulation transfer function value does not meet the preset value range condition but meets the low-frequency step exchanging condition, the variable step is determined according to the low-frequency modulation transfer function value, the lens is controlled to move according to the variable step, and the next focusing position which the lens moves to according to the xx step at is used as the new current focusing position. The problem that in the focusing manner in the related art, the peak value of the gradient values needs to be searched through the repeated hill climbing and the efficiency is relatively low is solved. Thus, the lens is focused quickly and efficiently, and no repeated hill climbing is required.

Figure 2F:
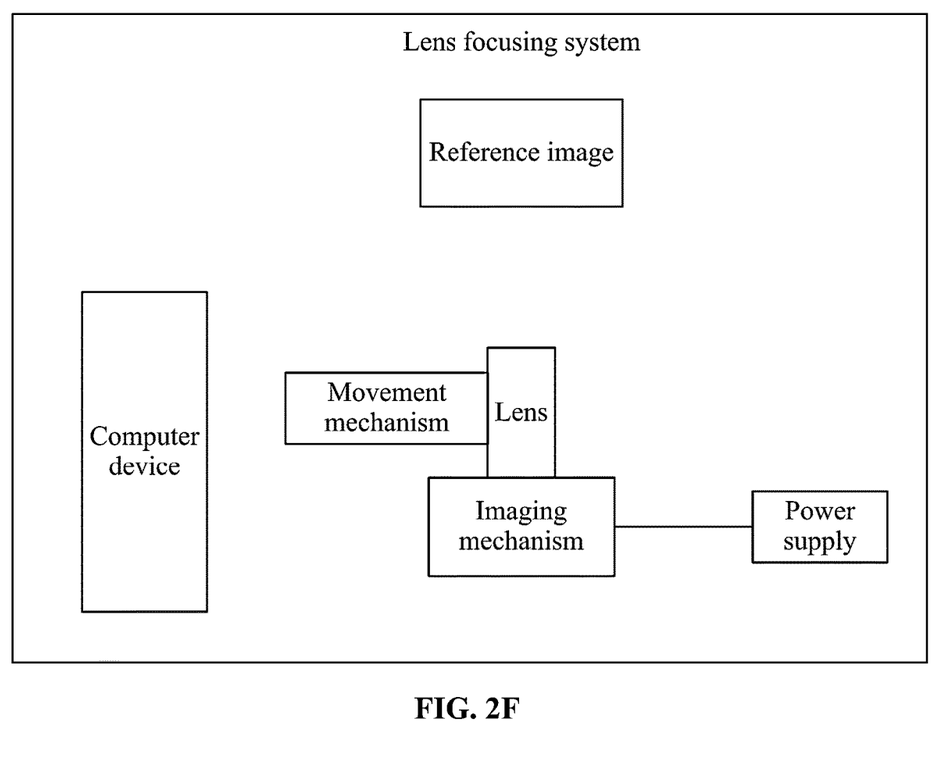
FIG. 2F is a structural diagram of a lens focusing system in an application scenario according to an embodiment of the present application.

An application scenario FIG. 2F is a structural diagram of a lens focusing system according to an application scenario according to an embodiment of the present application. As shown in FIG. 2F, the lens focusing system includes a reference image, a computer device, a movement mechanism, a lens, an imaging mechanism, and a power supply.

The reference image provides an image environment for the lens focusing system. The reference image includes a feature pattern with which an MTF value is calculated. The computer device is configured to acquire and record relevant data and perform image processing and analysis. The movement mechanism is configured to drive, according to a movement command sent by the computer device, the lens to move. The lens is connected to the imaging mechanism, and the imaging mechanism is powered on by the power supply.

In an embodiment, the computer device may be a high-performance computer, for example, an industrial personal computer.

In an embodiment, the movement mechanism may be a high-precision angular displacement slide.

In the embodiment of the present application, the movement mechanism drives the lens to move, after the lens obtains a test image by shooting, the imaging mechanism sends the test image to the computer device, and the computer device performs the calculation of a low-frequency MTF value on the test image and evaluates the contrast of the whole image. When the low-frequency MTF value is less than a preset value, the computer device sends an instruction to the movement mechanism to control a camera to move according to a large step. When the low-frequency MTF value is greater than or equal to the preset value, a high-frequency MTF value of the test image is calculated, a corresponding small step is determined according to the high-frequency MTF value, an instruction is sent to the movement mechanism, and the lens is driven to perform a small-step movement. The step is varied such that the lens movement is performed so that focusing is implemented. In addition, the computer device may store data in the focusing process in a database so as to perform problem backtracking and algorithm tuning.

In this embodiment, the reference image is shot by the lens at a current focusing position so that the test image is obtained, if the low-frequency modulation transfer function value of the test image meets a preset value range condition, the high-frequency modulation transfer function value of the test image is calculated, the movement step is determined according to the high-frequency modulation transfer function value, the lens moves to the next focusing position according to the movement step, and the next focusing position is used as a new current focusing position. The problem that in the focusing manner in the related art, the peak value of gradient values needs to be searched through the repeated hill climbing and efficiency is relatively low is solved. Thus, the lens is focused quickly and efficiently.

Figure 3:
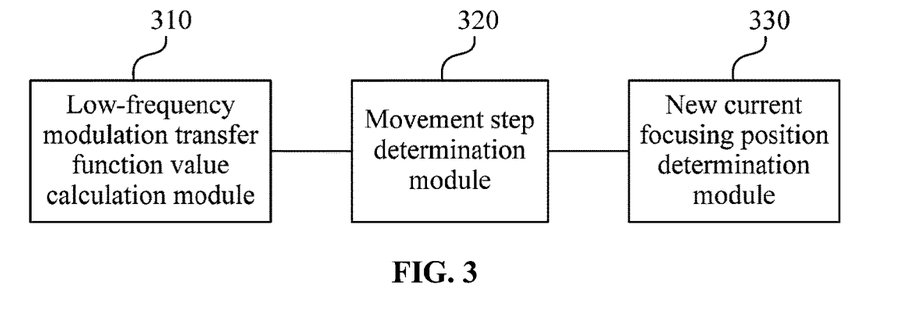
FIG. 3 is a structural diagram of an apparatus for lens focusing according to an embodiment of the present application.

FIG. 3 is a structural diagram of an apparatus for lens focusing according to an embodiment of the present application. The apparatus includes a low-frequency modulation transfer function value calculation module 310, a movement step determination module 320, and a new current focusing position determination module 330.

The low-frequency modulation transfer function value calculation module 310 is configured to acquire a test image obtained by a lens shooting a reference image at a current focusing position and determine a low-frequency modulation transfer function value of the test image.

The movement step determination module 320 is configured to, in response to determining that the low-frequency modulation transfer function value meets a preset value range condition, determine a high-frequency modulation transfer function value of the test image, determine a movement step according to the high-frequency modulation transfer function value, and control the lens to move according to the movement step.

The new current focusing position determination module 330 is configured to use the next focusing position which the lens moves to according to the movement step as the new current focusing position to focus the lens for one time.

In this embodiment, the reference image is shot by the lens at the current focusing position so that the test image is obtained, in response to the low-frequency modulation transfer function value of the test image meeting the preset value range condition, the high-frequency modulation transfer function value of the test image is calculated, the movement step is determined according to the high-frequency modulation transfer function value, the lens moves to the next focusing position according to the movement step, and the next focusing position is used as the new current focusing position. The problem that in the focusing manner in the related art, the peak value of gradient values needs to be searched through the repeated hill climbing and efficiency is relatively low is solved. Thus, the lens is focused quickly and efficiently.

In an embodiment, based on the preceding embodiment, the apparatus further includes an initialization module.

The initialization module is configured to acquire an initial step and use an initial focusing position as the first current focusing position.

The initial step is greater than the movement step.

In an embodiment, based on the preceding embodiment, the apparatus further includes a lens movement module.

The lens motion module is configured to, in response to determining that the low-frequency modulation transfer function value does not meet the preset value range condition but meets a low-frequency step exchanging condition, determine a variable step according to the low-frequency modulation transfer function value, control the lens to move according to the variable step, and use the next focusing position which the lens moves to according to the xx step as a new current focusing position.

In an embodiment, based on the preceding embodiment, the reference image includes a feature pattern.

The low-frequency modulation transfer function value calculation module 310 includes a desharpening unit and a unit for removing interference outside a feature image.

The desharpening unit is configured to acquire a shot image obtained by the lens shooting the reference image at the current focusing position and desharpen the shot image.

The unit for removing the interference outside the feature image is configured to remove the interference outside the feature image from the desharpened shot image to obtain the test image.

In an embodiment, based on the preceding embodiment, the low-frequency modulation transfer function value calculation module 310 includes a unit for calculating the low-frequency modulation transfer function value.

The unit for calculating the low-frequency modulation transfer function value is configured to generate a modulation transfer function curve of the test image and determine the low-frequency modulation transfer function value according to the modulation transfer function curve and a low-frequency band range of a spatial frequency.

The movement step determination module 320 includes a unit for calculating the high-frequency modulation transfer function value.

The unit for calculating the high-frequency modulation transfer function value is configured to determine the high-frequency modulation transfer function value according to the modulation transfer function curve and a high-frequency band range of the spatial frequency.

In an embodiment, based on the preceding embodiment, the low-frequency modulation transfer function value calculation module 310 includes a modulation transfer function curve generation unit.

The modulation transfer function curve generation unit is configured to position and obtain a feature pattern in the test image, calculate modulation transfer function values at different spatial frequencies of the feature pattern, and generate the modulation transfer function curve according to the modulation transfer function values.

In an embodiment, based on the preceding embodiment, the movement step determination module 320 includes a movement step determination unit.

The movement step determination unit is configured to determine a high-frequency modulation transfer function value interval in which the high-frequency modulation transfer function value falls and determine, according to the mapping relationship between high-frequency modulation transfer function value intervals and movement steps, the movement step which matches the high-frequency modulation transfer function value.

The apparatus for lens focusing provided by the embodiment of the present application may perform the method for lens focusing provided by any embodiment of the present application and has functional modules and beneficial effects corresponding to the performed method.

An Embodiment

Figure 4:
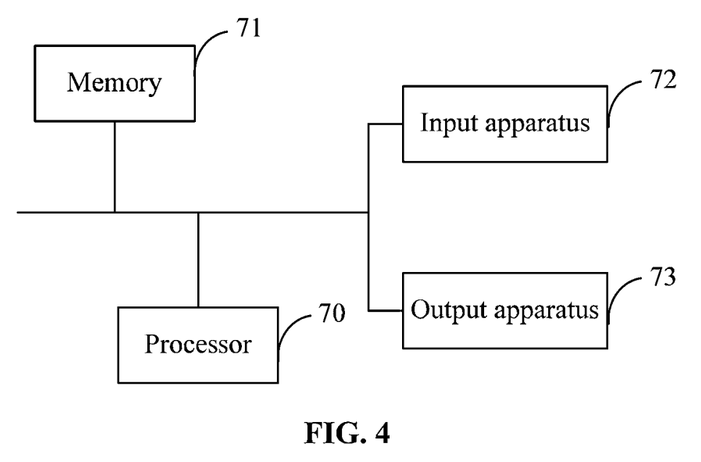
FIG. 4 is a structural diagram of a computer device according to an embodiment of the present application.

FIG. 4 is a structural diagram of a computer device according to an embodiment of the present application. As shown in FIG. 4, the computer device includes a processor 70, a memory 71, an input apparatus 72, and an output apparatus 73. One or more processors 70 may be in the computer device, and one processor 70 is used as an example in FIG. 4. The processor 70, the memory 71, the input apparatus 72, and the output apparatus 73 in the computer device may be connected through a bus or in other manners. In FIG. 4, the connection through the bus is used as an example.

The memory 71 as a computer-readable storage medium may be configured to store software programs and computer-executable programs and modules, for example, modules corresponding to the method for lens focusing in the embodiments of the present application (for example, the low-frequency modulation transfer function value calculation module 310, the movement step determination module 320, and the new current focusing position determination module 330 in the apparatus for lens focusing). The processor 70 executes software programs, instructions, and modules stored in the memory 71 to perform various functional applications and data processing of the computer device, that is, to implement the preceding method for lens focusing. The method includes the steps below.

A test image obtained by a lens shooting a reference image at a current focusing position is acquired, and a low-frequency modulation transfer function value of the test image is determined.

In response to determining that the low-frequency modulation transfer function value meets a preset value range condition, a high-frequency modulation transfer function value of the test image is determined, a movement step is determined according to the high-frequency modulation transfer function value, and the lens is controlled to move according to the movement step.

The next focusing position which the lens moves to according to the movement step is used as a new current focusing position to focus the lens for one time.

The memory 71 may mainly include a program storage region and a data storage region. The program storage region may store an operating system and at least one application required for functions. The data storage region may store data and the like created according to the use of the terminal. In addition, the memory 71 may include a high-speed random-access memory and may also include a non-volatile memory, such as at least one magnetic disk memory, a flash memory, or another non-volatile solid-state memory. In some examples, the memory 71 may further include memories which are remotely disposed with respect to the processor 70 and these remote memories may be connected to the computer device via a network. Examples of the preceding network include, but are not limited to, the Internet, an intranet, a local area network, a mobile communication network, and a combination thereof.

The input apparatus 72 may be configured to receive the inputted digital or character information and generate key signal input related to user settings and function control of the computer device. The output apparatus 73 may include a display device such as a display screen.

In an embodiment, the computer device may include a processor and a memory and may not include any input apparatus and any output apparatus.

An embodiment of the present application further provides a storage medium including computer-executable instructions, where when executed by a computer processor, the computer-executable instructions are configured to perform a method for lens focusing. The method includes the steps below.

A test image obtained by a lens shooting a reference image at a current focusing position is acquired, and a low-frequency modulation transfer function value of the test image is determined.

In response to determining that the low-frequency modulation transfer function value meets a preset value range condition, a high-frequency modulation transfer function value of the test image is determined, a movement step is determined according to the high-frequency modulation transfer function value, and the lens is controlled to move according to the movement step.

The next focusing position which the lens moves to according to the movement step is used as a new current focusing position to focus the lens for one time.

In the storage medium including the computer-executable instructions provided by the embodiment of the present application, the computer-executable instructions execute not only the preceding method operations but also related operations in the method for lens focusing provided by any embodiment of the present application.

From the preceding description of embodiments, it may be apparent to those skilled in the art that the embodiments of the present application may be implemented by means of software and necessary general-purpose hardware or may be implemented by hardware, but in many cases the former is a preferred embodiment. Based on such understanding, the embodiments of the present application essentially or some contributing to the related art may be embodied in the form of a software product. The computer software product may be stored in a computer-readable storage medium, such as a computer floppy disk, a read-only memory (ROM), a random-access memory (RAM), a flash, a hard disk, or an optical disk and includes several instructions for causing a computer device (which may be a personal computer, a server, a network device, or the like) to perform the methods described in the embodiments of the present application.

It is to be noted that units and modules included in the embodiment of the preceding apparatus for lens focusing are just divided according to functional logic but are not limited to such division, as long as the corresponding functions can be implemented. In addition, the specific names of the functional units are just used for distinguishing between each other and are not intended to limit the scope of the present application.

The preceding are only some embodiments of the present application and the technical principles used therein. It is to be understood by those skilled in the art that the present application is not limited to the embodiments described herein. For those skilled in the art, various apparent modifications, adaptations, and substitutions may be made without departing from the scope of the present application. Therefore, while the present application is described in detail through the preceding embodiments, the present application is not limited to the preceding embodiments and may include equivalent embodiments without departing from the concept of the present invention. The scope of the present application is determined by the scope of the appended claims.

What is claimed is:

1. A method for lens focusing, comprising:
   acquiring a test image obtained by a lens shooting a reference image at a current focusing position, and determining a low-frequency modulation transfer function value of the test image;
   in response to determining that the low-frequency modulation transfer function value meets a preset value range condition, determining a high-frequency modulation transfer function value of the test image;
   determining a movement step according to the high-frequency modulation transfer function value, and controlling the lens to move according to the movement step; and
   using a next focusing position which the lens moves to according to the movement step as a new current focusing position to focus the lens for one time.

2. The method according to claim 1, wherein before acquiring the test image obtained by the lens shooting the reference image at the current focusing position, the method further comprises:
   acquiring an initial step, and using an initial focusing position as a first current focusing position;
   wherein the initial step is greater than the movement step.

3. The method according to claim 1, further comprising:
   in response to determining that the low-frequency modulation transfer function value does not meet the preset value range condition but meets a low-frequency step exchanging condition, determining a variable step according to the low-frequency modulation transfer function value, controlling the lens to move according to the variable step, and using a next focusing position which the lens moves to according to the variable step as a new current focusing position.

4. The method according to claim 1, wherein the reference image comprises a feature pattern; and
   wherein acquiring the test image obtained by the lens shooting the reference image at the current focusing position comprises:
   acquiring a shot image obtained by the lens shooting the reference image at the current focusing position, and desharpening the shot image; and removing interference outside a feature image from the desharpened shot image to obtain the test image.

5. The method according to claim 1, wherein determining the low-frequency modulation transfer function value of the test image comprises:

generating a modulation transfer function curve of the test image, and determining the low-frequency modulation transfer function value according to the modulation transfer function curve and a low-frequency band range of a spatial frequency.

6. The method according to claim 5, wherein determining the high-frequency modulation transfer function value of the test image comprises:

determining the high-frequency modulation transfer function value according to the modulation transfer function curve and a high-frequency band range of the spatial frequency.

7. The method according to claim 6, wherein generating the modulation transfer function curve of the test image comprises:

positioning and obtaining a feature pattern in the test image, calculating modulation transfer function values at different spatial frequencies of the feature pattern, and generating the modulation transfer function curve according to the modulation transfer function values.

8. The method according to claim 1, wherein determining the movement step according to the high-frequency modulation transfer function value comprises:

determining a high-frequency modulation transfer function value interval in which the high-frequency modulation transfer function value falls, and determining, according to a mapping relationship between high-frequency modulation transfer function value intervals and movement steps, a movement step which matches the high-frequency modulation transfer function value.

9. A computer device, comprising a memory, a processor, and a computer program stored in the memory and executable by the processor, wherein the processor, when executing the computer program, implements:

acquiring a test image obtained by a lens shooting a reference image at a current focusing position, and determining a low-frequency modulation transfer function value of the test image;

in response to determining that the low-frequency modulation transfer function value meets a preset value range condition, determining a high-frequency modulation transfer function value of the test image;

determining a movement step according to the high-frequency modulation transfer function value, and controlling the lens to move according to the movement step; and using a next focusing position which the lens moves to according to the movement step as a new current focusing position to focus the lens for one time.

10. A non-transitory computer-readable storage medium, comprising computer-executable instructions, wherein the computer-executable instructions, when executed by a computer processor, are configured to perform:

acquiring a test image obtained by a lens shooting a reference image at a current focusing position, and determining a low-frequency modulation transfer function value of the test image;

in response to determining that the low-frequency modulation transfer function value meets a preset value range condition, determining a high-frequency modulation transfer function value of the test image;

determining a movement step according to the high-frequency modulation transfer function value, and controlling the lens to move according to the movement step; and using a next focusing position which the lens moves to according to the movement step as a new current focusing position to focus the lens for one time.

11. The computer device according to claim 9, wherein the processor, when executing the computer program, implements:

before acquiring the test image obtained by the lens shooting the reference image at the current focusing position, acquiring an initial step, and using an initial focusing position as a first current focusing position;

wherein the initial step is greater than the movement step.

12. The computer device according to claim 9, wherein the processor, when executing the computer program, implements:

in response to determining that the low-frequency modulation transfer function value does not meet the preset value range condition but meets a low-frequency step exchanging condition, determining a variable step according to the low-frequency modulation transfer function value, controlling the lens to move according to the variable step, and using a next focusing position which the lens moves to according to the variable step as a new current focusing position.

13. The computer device according to claim 9, wherein the reference image comprises a feature pattern; and wherein the processor, when executing the computer program, implements:

acquiring a shot image obtained by the lens shooting the reference image at the current focusing position, and desharpening the shot image; and removing interference outside a feature image from the desharpened shot image to obtain the test image.

14. The computer device according to claim 9, wherein the processor, when executing the computer program, implements:

generating a modulation transfer function curve of the test image, and determining the low-frequency modulation transfer function value according to the modulation transfer function curve and a low-frequency band range of a spatial frequency.

15. The computer device according to claim 9, wherein the processor, when executing the computer program, implements:

determining a high-frequency modulation transfer function value interval in which the high-frequency modulation transfer function value falls, and determining, according to a mapping relationship between high-frequency modulation transfer function value intervals and movement steps, a movement step which matches the high-frequency modulation transfer function value.

16. The storage medium according to claim 10, wherein the computer-executable instructions, when executed by a computer processor, are configured to perform:

before acquiring the test image obtained by the lens shooting the reference image at the current focusing position, acquiring an initial step, and using an initial focusing position as a first current focusing position;

wherein the initial step is greater than the movement step.

17. The storage medium according to claim 10, wherein the computer-executable instructions, when executed by a computer processor, are configured to perform:

in response to determining that the low-frequency modulation transfer function value does not meet the preset value range condition but meets a low-frequency step exchanging condition, determining a variable step according to the low-frequency modulation transfer function value, controlling the lens to move according to the variable step, and using a next focusing position which the lens moves to according to the variable step as a new current focusing position.

18. The storage medium according to claim 10, wherein the reference image comprises a feature pattern; and wherein the computer-executable instructions, when executed by a computer processor, are configured to perform:

acquiring a shot image obtained by the lens shooting the reference image at the current focusing position, and desharpening the shot image; and removing interference outside a feature image from the desharpened shot image to obtain the test image.

19. The storage medium according to claim 10, wherein the computer-executable instructions, when executed by a computer processor, are configured to perform:

generating a modulation transfer function curve of the test image, and determining the low-frequency modulation transfer function value according to the modulation transfer function curve and a low-frequency band range of a spatial frequency.

20. The storage medium according to claim 10, wherein the computer-executable instructions, when executed by a computer processor, are configured to perform:

determining a high-frequency modulation transfer function value interval in which the high-frequency modulation transfer function value falls, and determining, according to a mapping relationship between high-frequency modulation transfer function value intervals and movement steps, a movement step which matches the high-frequency modulation transfer function value.

* * * * *